United States Patent
Nagai

(10) Patent No.: US 11,340,351 B2
(45) Date of Patent: May 24, 2022

(54) TIME-OF-FLIGHT DISTANCE MEASUREMENT DEVICE

(71) Applicant: DENSO CORPORATION, Kariya (JP)

(72) Inventor: Toshiaki Nagai, Kariya (JP)

(73) Assignee: DENSO CORPORATION, Kariya (JP)

( * ) Notice: Subject to any disclaimer, the term of this patent is extended or adjusted under 35 U.S.C. 154(b) by 739 days.

(21) Appl. No.: 16/321,952

(22) PCT Filed: Jul. 27, 2017

(86) PCT No.: PCT/JP2017/027287
§ 371 (c)(1),
(2) Date: Jan. 30, 2019

(87) PCT Pub. No.: WO2018/025749
PCT Pub. Date: Feb. 8, 2018

(65) Prior Publication Data
US 2019/0179017 A1 Jun. 13, 2019

(30) Foreign Application Priority Data
Aug. 1, 2016 (JP) .............................. JP2016-151204

(51) Int. Cl.
*G01S 17/36* (2006.01)
*G01S 17/10* (2020.01)
(Continued)

(52) U.S. Cl.
CPC ................ *G01S 17/36* (2013.01); *G01C 3/06* (2013.01); *G01S 7/483* (2013.01); *G01S 7/4865* (2013.01); *G01S 17/10* (2013.01)

(58) Field of Classification Search
CPC . G01C 3/06; G01S 17/10; G01S 17/36; G01S 7/483; G01S 7/4865; G01S 17/89;
(Continued)

(56) References Cited

U.S. PATENT DOCUMENTS 5,075,863 A * 12/1991 Nagamune ............ G01S 13/288
702/159
7,405,812 B1   7/2008 Bamji
(Continued)

FOREIGN PATENT DOCUMENTS

DE          197 04 496 A1   3/1998
DE    10 2010 003 409 A1   9/2011
(Continued)

*Primary Examiner* — Yuqing Xiao
*Assistant Examiner* — Amir J Askarian
(74) *Attorney, Agent, or Firm* — Maschoff Brennan

(57) ABSTRACT

A digital signal processing circuit measures a distance according to a plurality of modulation frequencies including a first modulation frequency and a second modulation frequency lower than the first modulation frequency. The digital signal processing circuit is configured such that, when measuring the distance at the first modulation frequency, a storage capacitance of a light receiving element 6 stores or discharges electric charges according to the timing when the polarity of a phase is controlled by a light emission control unit at each transmission of a sub sequence and the distance is measured according to the electric charges stored in the storage capacitance. The digital signal processing circuit corrects the distance measurement result based on the measurement result at the first modulation frequency and the measurement result at the second modulation frequency.

10 Claims, 13 Drawing Sheets

(51) Int. Cl.
  *G01S 7/483*   (2006.01)
  *G01C 3/06*   (2006.01)
  *G01S 7/4865*   (2020.01)

(58) Field of Classification Search
  CPC .... G01S 13/325; G01S 13/282; G01S 13/288; G01S 13/36; G01S 13/885; G01S 13/904; G01S 13/91; G01S 13/92; G01S 15/104; G01S 15/895; G01S 17/26; G01S 7/35; A61B 8/5207; B22D 2/003; G01F 23/284; G11C 27/02; H01S 3/08; H03F 3/45968; H03M 1/1245; H04B 1/16
  See application file for complete search history.

(56) References Cited

U.S. PATENT DOCUMENTS

| | | | |
|---|---|---|---|
| 7,436,495 B2* | 10/2008 | Tachino | G01S 17/894 356/4.07 |
| 7,719,590 B2* | 5/2010 | Ellis-Monaghan | H01L 27/14609 348/308 |
| 7,791,715 B1 | 9/2010 | Bamji | |
| 8,482,656 B2* | 7/2013 | Sato | G02B 7/36 348/345 |
| 8,699,008 B2 | 4/2014 | Murakami et al. | |
| 2008/0079833 A1* | 4/2008 | Ichikawa | G01S 17/894 348/311 |
| 2009/0072170 A1 | 3/2009 | Kurihara et al. | |
| 2009/0079857 A1* | 3/2009 | Kato | H04N 5/3742 348/294 |
| 2009/0079955 A1 | 3/2009 | Tsunesada et al. | |
| 2009/0122297 A1 | 5/2009 | Ikeno et al. | |
| 2010/0245156 A1* | 9/2010 | Matsumoto | G01S 7/35 342/127 |
| 2011/0299059 A1 | 12/2011 | Buettgen et al. | |
| 2012/0050716 A1 | 3/2012 | Murakami et al. | |
| 2012/0098964 A1 | 4/2012 | Oggier et al. | |
| 2012/0209113 A1* | 8/2012 | Sankar | H01S 3/08 600/437 |
| 2014/0045444 A1* | 2/2014 | Furuta | H03F 3/45968 455/230 |
| 2014/0184746 A1* | 7/2014 | Kang | H04N 13/204 348/46 |
| 2015/0120241 A1 | 4/2015 | Kadambi et al. | |
| 2015/0144790 A1* | 5/2015 | Velichko | G01S 17/894 250/338.4 |
| 2017/0142325 A1* | 5/2017 | Shimokawa | H04N 5/232122 |

FOREIGN PATENT DOCUMENTS

| | | |
|---|---|---|
| DE | 10 2014 210 750 B3 | 6/2015 |
| DE | 10 2015 223 674 A1 | 6/2016 |
| JP | 2006-300616 A | 11/2006 |
| JP | 2006-308522 A | 11/2006 |
| JP | 2009-124398 A | 6/2009 |
| WO | 2010/098454 A1 | 9/2010 |

* cited by examiner

TIME-OF-FLIGHT DISTANCE MEASUREMENT DEVICE

CROSS-REFERENCE TO RELATED APPLICATION

This patent application is a national stage application of PCT Application No. PCT/JP2017/027287, filed on Jul. 27, 2017, which claims priority to Japanese Patent Application No. 2016-151204 filed on Aug. 1, 2016 in the Japan Patent Office, the entire disclosure of which is incorporated herein by reference.

TECHNICAL FIELD

The present disclosure relates to a time-of-flight distance measurement device that emits light modulated in a pattern with a repetition period to a space, receives incident light including reflected light from a target on which the modulated light has been reflected, and divides and stores electric charges into a plurality of storage capacitors, and calculates the distance from the subject device to the target by using sampled values.

BACKGROUND ART

As a device that calculates the distance from the subject device to a target in a contactless manner, there has been provided a time-of-flight (TOF) distance measurement device (for example, refer to PTL 1). The time-of-flight distance measurement device emits light (distance measurement light) modulated in a pattern with a repetition period to a space, receives incident light including reflected light from the target on which the modulated light has been reflected. Then, the time-of-flight distance measurement device divides and stores electric charge corresponding to the received incident light into a plurality of storage capacitors, and calculates the distance from the subject device to the target by using sampled values.

There is a demand for decrease of a distance error in a time-of-flight distance measurement device. As methods for decreasing a distance error, a phase angle error is suppressed, that is, a signal-to-noise ratio (SNR) is increased, or a modulation frequency is increased. To increase the SNR, light-emission power may be enhanced to increase a signal component, an optical filter may be used to decrease a noise component, or the number of integrations may be increased.

CITATION LIST

Patent Literatures

[PTL 1] U.S. Unexamined Patent Application Publication No. 2012/0098964
[PTL 2] U.S. Pat. No. 7,791,715
[PTL 3] WO 2010/098454

SUMMARY OF THE INVENTION

However, according to the method by which to increase the modulation frequency, the distance at which aliasing occurs is shorter with increase in the modulation frequency, which makes it difficult to differentiate between a near target and a distant target.

In addition, when signals of light emitted from a large number of sensors are received, interference occurs between the received signals. To solve this problem, PTL 1 suggests a method for improving interference resistance between cameras by dividing an exposure sequence by time unit and inserting a random or pseudo random phase delay by the time unit to change the phase. This method is effective in the absence of intense background light, that is, a common-mode component. However, in the presence of the common-mode component, this method causes storage of electric charge only in the capacitance on one side of a differential during the inserted phase delay, which would result in an error.

In addition, when a delay time is set for each pulse using a spread spectrum technology of PN modulation, the exposure time necessary for obtaining the same SNR as that in the case of performing exposure by modulation without a random pattern becomes longer. That is, it is desired to solve the aliasing problem and the interference problem at the same time with a sufficient accuracy and at a sufficient speed.

The present disclosure has been devised under the foregoing circumstances. An object of the present disclosure is to provide a time-of-flight distance measurement device that avoids the influence of aliasing and, if there are a large number of sensors, prevents interference between them.

According to an aspect of the present disclosure, a light emission control unit emits light modulated at least at two or more different modulation frequencies including a first modulation frequency and a second modulation frequency. A light reception control unit receives incident light including reflected light from a target at which modulated light has been reflected and samples electric charge stored in a light receiving element that divides and stores the electric charge corresponding to the incident light into a plurality of storage capacitances. A distance measurement unit measures the distance from the subject device to the target.

When a pattern of the modulated light in which a pulse pattern at the first modulation frequency highest among the plurality of modulation frequencies is repeated N times, where N is a natural number of 2 or larger, is a sub sequence, the light emission control unit controls a light emitting element to emit light such that the phase polarity is changed in a forward or reverse direction at random with a ½ probability at each transmission of the sub sequence. The distance measurement unit measures the distance according to a plurality of modulation frequencies including the first modulation frequency and the second modulation frequency lower than the first modulation frequency.

When the distance measurement unit measures the distance at the first modulation frequency, the light reception control unit samples the electric charges stored in the light receiving element according to the timing when the light emission control unit controls the phase polarity at each transmission of the sub sequence, and the distance measurement unit measures the distance. Then, the distance measurement unit corrects the distance measurement result based on the measurement result at the first modulation frequency and the measurement result at the second modulation frequency.

The light emission control unit controls the change of the phase polarity in the forward or reverse direction at random with a ½ possibility at each transmission of the sub sequence so that the distance is measured according to the phase polarity changed in the forward or reverse direction. Accordingly, at each transmission of the sub sequence, the distribution of the electric charges is changed at random with a ½ probability. In addition, the storage of electric charges is repeated a large number of times, and thus the electric charges are averagely distributed on the positive and negative sides. Therefore, if there is a risk of influence from another sensor, the influence can be minimized.

The measurement result at the second modulation frequency has no influence of aliasing on at least a signal reflected from the range corresponding to the N periods of the pulse pattern at the first modulation frequency. Accordingly, measuring the distance according to the distance measurement process at the second modulation frequency makes it possible to eliminate the influence of aliasing to a minimum.

BRIEF DESCRIPTION OF THE DRAWINGS

The foregoing and other objects, features, and advantages of the present disclosure will be more clarified by the following detailed descriptions with reference to the accompanying drawings. The drawings are as follows.

DESCRIPTION OF EMBODIMENTS

Figure 1:
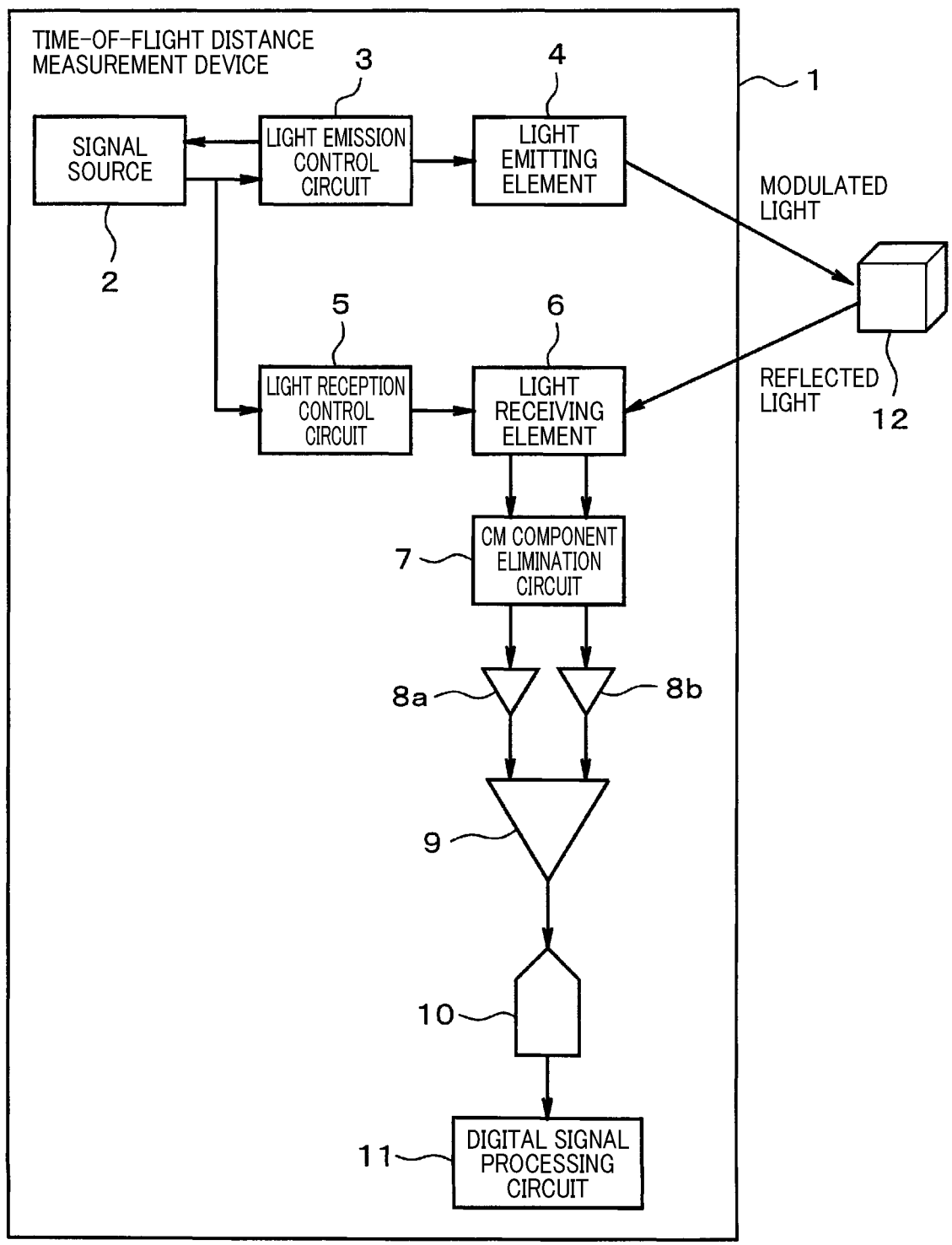
FIG. 1 is a functional block diagram of a first embodiment.

Hereinafter, several embodiments applied to a time-of-flight distance measurement device installable in a vehicle, for example, will be described with reference to the drawings. In relation to the following embodiments, the components with identical or similar functions will be described with identical reference signs, and descriptions of configurations, actions, and co-operations of the components with the identical or similar functions will be omitted as appropriate.

First Embodiment

FIGS. 1 to 5 are illustrative diagrams of a first embodiment. A time-of-flight distance measurement device (hereinafter, simply called distance measurement device) 1 includes a signal source 2, a light emission control circuit 3 as a light emission control unit, a light emitting element 4, a light reception control circuit 5 as a light reception control unit, a light receiving element 6, a common-mode (CM) component elimination circuit 7, buffers 8a and 8b, a difference detection circuit 9, an AD conversion circuit 10, and a digital signal processing circuit 11. The digital signal processing circuit 11 acts as a distance measurement unit, a signal processing unit, a discharge control unit, an extension setting unit, and a comparison unit. The distance measurement device 1 is configured to calculate the distance from the subject device to a target 12. The target 12 is a person, an object, another vehicle such as a preceding vehicle, an obstacle on a road, a wall as a roadside object, or the like, for example.

The signal source 2 outputs drive signals to the light emission control circuit 3 and the light reception control circuit 5. As the drive signals, pulsed signal at predetermined frequencies (f1/2, f1, and f2) are used. The light emission control circuit 3 causes the light emitting element 4 to emit modulated light according to the drive signal from the signal source 2. Accordingly, the light emitting element 4 can emit modulated light to the target 12 according to a plurality of modulation frequencies.

The light reception control circuit 5 controls exposure of the light receiving element 6 according to the drive signal from the signal source 2. At this time, since the light emission control circuit 3 and the light reception control circuit 5 receive the same drive signal, the light emission control circuit 3 and the light reception control circuit 5 can synchronize with each other. In synchronization with the modulated light emitted by the light emission control circuit 3 under the control of the light emitting element 4, the light reception control circuit 5 can adjust and control the exposure period of the light receiving element 6.

At this time, the drive signal output by the signal source 2 may be a rectangular pulse (in general, several to several tens of MHz) for driving the light emitting element 4 and the light receiving element 6 or a synchronization pulse.

Figure 2:
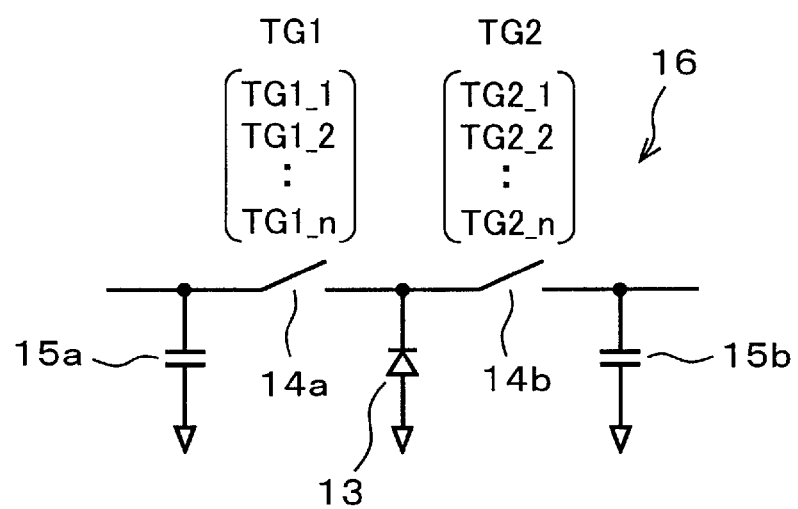
FIG. 2 is a diagram illustrating a partial configuration of a light receiving element.

The light emitting element 4 is a laser diode (LD) or a light emitting diode (LED) that emits infrared light, for example, as modulated light. The light receiving element 6 is an image sensor using a process of a complementary metal oxide semiconductor (CMOS) or a charge coupled device (CCD), for example. As illustrated in FIG. 2, the light receiving element 6 includes a large number of pixels 16 each of which has a photodiode (PD) 13, two modulation switches 14a and 14b, and two storage capacitances 15a and 15b capable of storing and discharging electric charge.

The two modulation switches 14a and 14b can be formed from MOS-type devices such as MOS transistors or transfer gates, for example. The two storage capacitances 15a and 15b can be formed from capacitance elements such as MOSs, CCDs, and metal insulator metals (MIMs), wires, parasitic capacitances of PN junctions, and others, for example.

When the light reception control circuit 5 drives the modulation switches 14a and 14b to turn on or off in response to control signals TG1 and TG2, the light receiving element 6 divides photoelectrons resulting from the received incident light into the storage capacitances 15a and 15b and outputs signals indicating the amounts of divided photoelectrons to the CM component elimination circuit 7. The control signals TG1 and TG2 are signals synchronized with the modulated light, and the amounts of electric charges of the photoelectrons divided into the storage capacitances 15a and 15b vary depending on the distance from the time-of-flight distance measurement device 1 to the target 12. FIG. 2 illustrates the two storage capacitances 15a and 15b, but three or more storage capacitances may be provided.

When there exists a non-negligible level of background light to the received modulated light, the CM component elimination circuit 7 eliminates the common-mode component to suppress the influence of the background light to a minimum. The CM component elimination circuit 7 is provided to eliminate the common-mode component that is generated at the time of occurrence of a random phase inversion. As methods for eliminating the CM component, there have been disclosed various techniques in prior literatures. For example, those methods are disclosed in U.S. Pat. No. 6,919,549B2, DE 102005056774A1, EP 1622200A1, and others. In this case, the CM component elimination circuit 7 is provided explicitly. However, when a sufficient range without saturation in a signal path can be ensured, the same function can be implemented by the difference detection circuit 9 or the AD conversion circuit 10 of differential input type.

The difference detection circuit 9 detects a difference between the signals from the CM component elimination circuit 7 via the buffers 8a and 8b, and outputs a signal corresponding to the detected difference to the AD conversion circuit 10. The buffers 8a and 8b are formed from source-follower circuits, for example. The difference detection circuit 9 is formed from a differential amplifier, for example.

The AD conversion circuit 10 converts an analog signal from the difference detection circuit 9 into a digital signal, and outputs the same to the digital signal processing circuit 11. The digital signal processing circuit 11 performs digital signal processing on the signal from the AD conversion circuit 10 to calculate the amounts of electric charges of photoelectrons divided into the storage capacities 15a and 15b and measure the distance from the subject device to the target 12, that is, perform a distance measurement.

Figure 3:
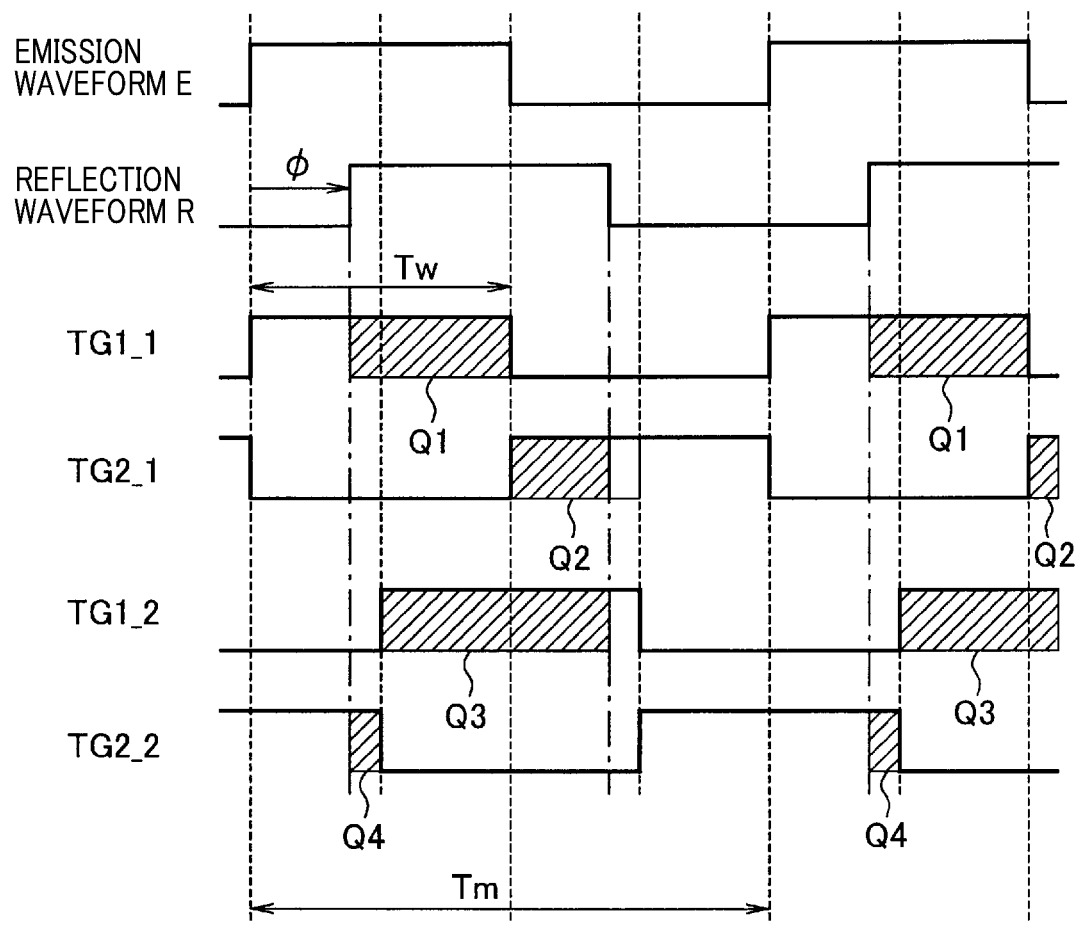
FIG. 3 is a diagram illustrating a basic four-phase sequence.

FIG. 3 is an illustrative diagram of a basic sequence (the modulation frequency is designated as Tm and the exposure period as Tw) in which the light receiving element 6 is driven in four phases at a constant modulation frequency and at a duty ratio of emission waveform of 50%.

The waveform of the modulated light emitted from the light emitting element 4 (emission waveform 110) is modulated by a rectangular wave in synchronization with the control signals TG1 and TG2. FIG. 3 illustrates a case of modulation using the rectangular wave, but the modulation may be performed by a sine wave, a triangular wave, or the like. The waveform of the reflected light from the target 12 on which the modulated light has been reflected (reflection waveform 120) has a temporal difference from the emission waveform 110. The reflection waveform 120 lags behind the emission waveform 110 by a phase difference cp. The control signals TG1 and TG2 are driven by rectangular waves different by 90 degrees in phase.

The light emission control circuit 3, the light reception control circuit 5, and the digital signal processing circuit 11 repeat a sequence driven in response to control signals TG1-1 and TG2-1 (drive waveforms 111 and 121) several thousands to several hundreds of thousands of times. The digital signal processing circuit 11 acquires through the AD conversion circuit 10 information on generated optical charges Q1 and Q2 as the values of voltages having undergone charge-voltage conversion. Hereinafter, a period in which the control signal TG1 is "H" in synchronization with the timing of the emission waveform E will be called "0-degree exposure".

After that, the light emission control circuit 3, the light reception control circuit 5, and the digital signal processing circuit 11 repeat a sequence driven in response to control signals TG1-2 and TG2-2 (drive waveforms 112 and 122) several thousands to several hundreds of thousands of times. The digital signal processing circuit 11 acquires through the AD conversion circuit 10 information on generated optical charges Q3 and Q4 as the values of voltages having undergone charge-voltage conversion. Hereinafter, a period in which the control signal TG1 is "H" in synchronization with the timing lagging by 90 degrees in phase behind the timing of the emission waveform E will be called "90-degree exposure". The digital signal processing circuit 11 calculates the phase difference θ by the following arithmetic equation (1) using a discrete Fourier transform (DFT) from the acquired optical charges Q1 to Q4:

$$\theta = \tan^{-1}[(Q1-Q3)/(Q2-Q4)] \tag{1}$$

The arithmetic equation (1) is an arithmetic equation of a phase difference based on the foregoing four samples. As for the general H phase, the phase difference θ can be calculated by the following arithmetic equation (2):

$$\theta = \tan^{-1}[(\Sigma Qk \times \sin(2\pi/H \times k))/(\Sigma Qk \times \cos(2\pi/H \times k))] \tag{2}$$

The phase difference θ can be determined by performing the basic process as described above, and a distance d form the distance measurement device 1 to the target 12 can be determined based on the phase difference θ. At the execution of the basic process as described above, a distance error σd can be calculated by the following equation (3):

$$\sigma d \propto (1/\text{SNR}) \cdot (c/f \text{mod}) \tag{3}$$

In the equation (3), SNR represents S/N ratio, c is light speed, and fmod is modulation frequency. Accordingly, the distance error σd can be reduced by increasing the S/N ratio or the modulation frequency fmod. It is more desired to increase the modulation frequency fmod, but this would make the measurement distance range shorter under the influence of aliasing to cause a fundamental tradeoff between measurable distance and accuracy.

Figure 4:
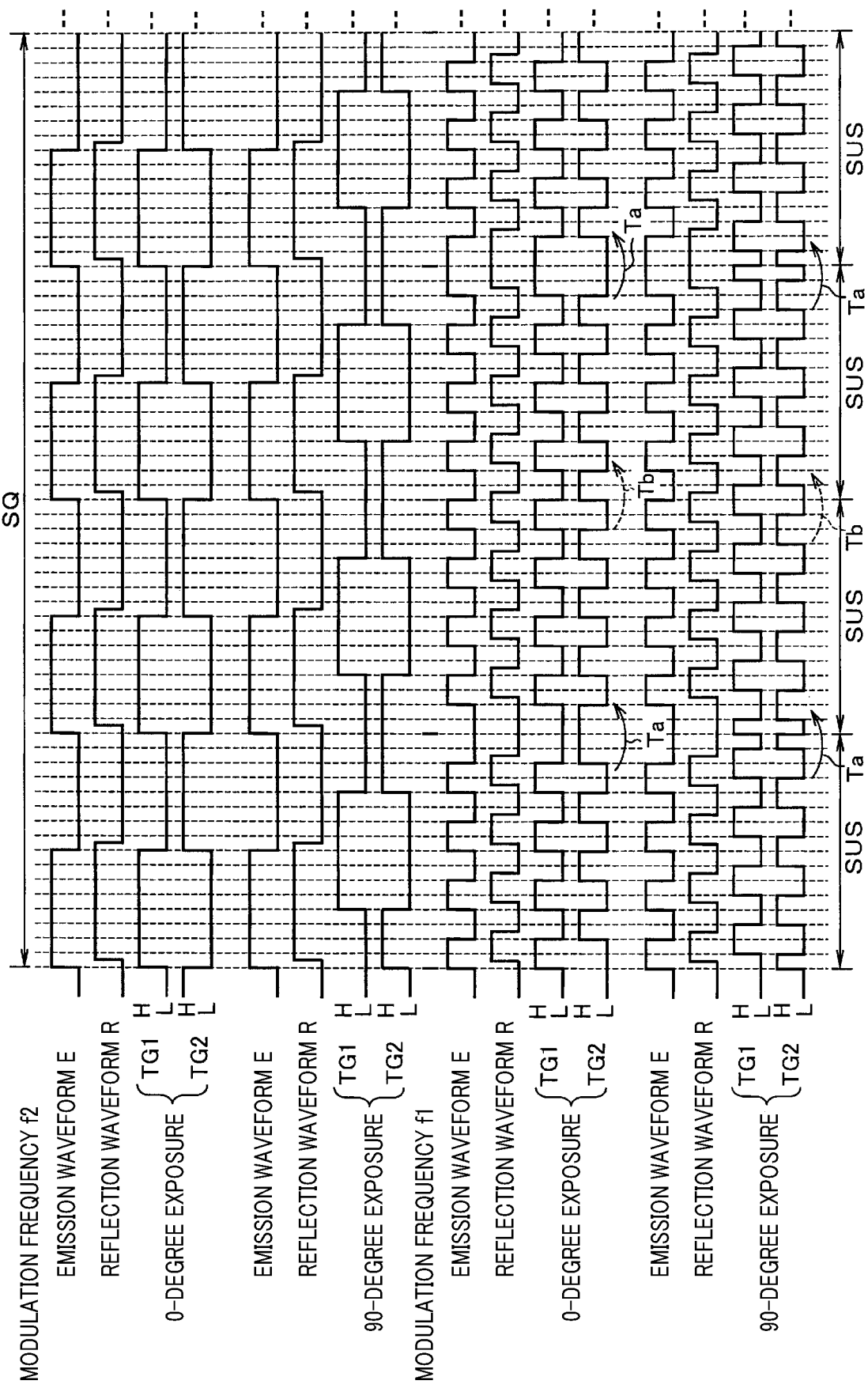
FIG. 4 is a diagram illustrating a sequence.

Accordingly, in the present embodiment, the foregoing basic principle is applied to execute processing in the sequence illustrated in FIG. 4. In the present embodiment, the light emitting element 4 is caused to emit light at the two modulation frequencies f1 and f2, and the light receiving element 6 is caused to execute a light reception sequence SQ and a sub sequence SUS. Hereinafter, descriptions will be given as to an example in which sequence processing is performed twice at the first modulation frequency f1 (=fmax) and the second modulation frequency f2 (<f1). In the present embodiment, the period of the modulation frequency f2 is conformed to the period of the sub sequence SUS at the modulation frequency f1, and the modulation frequency f2 is set to ¼ of the modulation frequency f1 (equivalent to 1/N).

First, the light emission control circuit 3 executes the sequence SQ in which a pulse driven in response to the control signals TG1-1 and TG2-1 (drive waveforms 111 and 121) is modulated and emitted in a fixed period according to the second modulation frequency f2. The light receiving element 6 receives the light lagging behind the emission waveform E, the light reception control circuit 5 subjects the reflection waveform R to 0-degree exposure, and the digital signal processing circuit 11 acquires through the AD conversion circuit 10 the voltage values of information on the generated optical charges Q1 and Q2 having undergone charge-voltage conversion.

By repeating this process for 90-degree exposure as well, the light emission control circuit 3 executes the sequence SQ in which a pulse driven in response to control signals TG1-2 and TG2-2 (drive waveforms 112 and 122) is modulated and emitted in the fixed period of the second modulation frequency f2. The light receiving element 6 receives the light lagging behind the emission waveform E, the light reception control circuit 5 subjects the reflection waveform R to 90-degree exposure, and the digital signal processing circuit 11 acquires the information on the generated optical charges Q3 and Q4. Then, the digital signal processing circuit 11 calculates a phase difference θ2 by the foregoing equation (1) using discrete Fourier transform (DFT) from the acquired optical charges Q1 to Q4.

Figure 5:
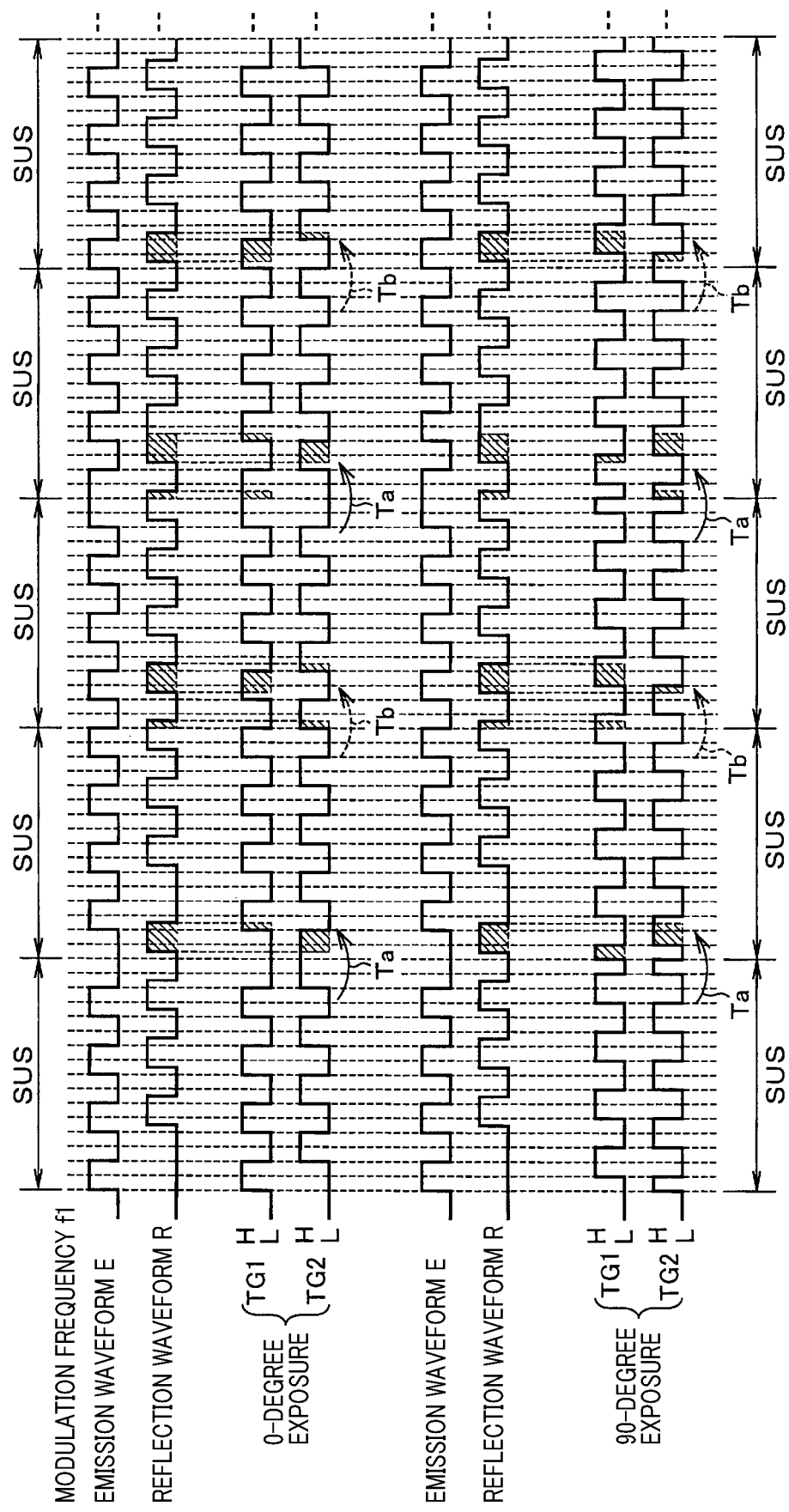
FIG. 5 is a diagram illustrating a sequence of temporal changes of electric charge storage.

The light emission control circuit 3 also uses the sub sequence SUS in which a pulse driven in response to the control signals TG1-1 and TG2-1 (drive waveforms 111 and 121) is repeated N times at the modulation frequency f1 to change the phase polarity in the forward or reverse direction at random with a ½ probability at each execution of the sub sequence SUS, and repeats the sub sequence SUS several tens to several hundreds of thousands of times. In this case, the "N times" is desirably set to a natural number of 2 or larger that is significantly smaller than the number of repetitions of the sub sequence SUS, such as powers of 2 or two to ten times (for example, 3, 4, 8, and 16 times). Among them, in particular, setting to a power of 2=4, 8, 16, or 32 would make it easy to configure a logic by hardware or software, for example, in a more desirable manner. FIGS. 4 and 5 illustrate a timing Ta for forward polarity change by solid lines and illustrate a timing Tb for reverse polarity change by broken lines.

The modulation frequency f1 used at this time is higher than the modulation frequency f2 and is set to f1×4 (that is, N times), for example. In addition, as an example of a method for determining on the reversion of the random phase polarity with a ½ probability, a random series is created using an M series, for example, and the phase polarity is changed in the forward or reverse direction along the random series.

The light receiving element 6 receives the light behind the emission waveform E, the light reception control circuit 5 subjects the reflection waveform R to 0-degree exposure, and the digital signal processing circuit 11 acquires the information on the generated optical charges Q1 and Q2. This process is repeated for 90-degree exposure. At this time, the light emission control circuit 3 uses the sub sequence SUS in which a pulse driven in response to the control signals TG1-2 and TG2-2 (drive waveforms 112 and 122) is repeated N times at the modulation frequency f1 to change the phase polarity in the forward or reverse direction at random with a ½ probability at each execution of the sub sequence SUS, and repeats the sub sequence several tens to several hundreds of thousands of times. The timing for random phase polarity reversion in the 90-degree exposure process is identical to the timing for random phase polarity forward/reverse change in the 0-degree exposure process described above. Therefore, the phase polarity is changed in the forward or reverse direction along the random series created as described above, and the 0-degree exposure and the 90-degree exposure are performed at a synchronized timing.

The light receiving element 6 receives the light behind the emission waveform E, the light reception control circuit 5 subjects the reflection waveform R to 90-degree exposure, and the digital signal processing circuit 11 acquires the information on the generated optical charges Q3 and Q4. Then, the digital signal processing circuit 11 calculates the phase difference θ1 according to the equation (1) using discrete Fourier transform (DFT) from the acquired optical charges Q1 to Q4.

The digital signal processing circuit 11 makes a correction in the distance measurement process based on the measurement result at the modulation frequency f2 and the measurement result at the modulation frequency f1.

In the measurement process at the modulation frequency f1, the distance range of ½×c/f1 can be measured. In the present embodiment, f1 is set to the maximum frequency fmax. The modulation frequency f2 is lower than the modulation frequency f1. The modulation frequency f2 is set to satisfy the condition under which the distance range of values equal to or greater than ½×c/f1×N (=½×c/fmax×N) can be measured. Using the two frequencies f1 and f2 makes it possible to perform a distance measurement process without the influence of another sensor or the influence of aliasing.

The operations of the foregoing configuration will be described. In the present embodiment, the process sequence at the modulation frequency f1 is divided into sub sequences SUS with a pulse pattern of a short fixed period, and the polarity of light emission or light reception is changed in the forward or reverse direction according to a random numerical series with a ½ probability at each execution of the subsequence SUS. When there is a large number of sensors in a space, they interfere with each other. For example, while the circuits 2 to 11 in the distance measurement device 1 perform light-emission/light-reception processing at the modulation frequency f2, when the light emitting element of another sensor emits light and the light receiving element 6 of the distance measurement device 1 receives the light, positive or negative light receiving electric charges Q1, Q2, Q3, and Q4 are distributed at each execution of the sub sequence SUS.

Therefore, when the circuits 2 to 11 of the distance measurement device 1 change the polarity of light emission or light reception in the forward or reverse direction with a ½ probability at each execution of the sub sequence SUS, the distribution of the electric charges Q1, Q2, Q3, and Q4 is equalized. Therefore, the influence of light emission from another sensor is eliminated together with background light by the CM component elimination circuit 7 based on the evenly distributed electric charges Q1, Q2, Q3, and Q4.

FIG. 5 illustrates a timing chart in which the reflection waveform R lags behind the emission waveform E by one or more periods. In this case, the emission waveform E of light emitted in one sub sequence SUS may match the timing for light reception in the next sub sequence SUS to cause the influence of aliasing.

In the present embodiment, however, the polarity of light emission or light reception is changed in the forward or reverse direction at random during the temporally consecutive sub sequences SUS. Accordingly, as hatched in FIG. 5, the distribution of the electric charges Q1, Q2, Q3, and Q4 is changed at random with a ½ probability, and the electric charge storage process is repeated a large number of times (for example, about several hundreds of thousands of times), and thus the electric charges are evenly distributed to the positive and negative sides.

Accordingly, aliasing occurs until the N period of the pulse pattern at the modulation frequency f1 but signals reflected from a corresponding range beyond that phase are eliminated by the CM component elimination circuit 7. Thus, if there is a risk of influence of aliasing, the influence can be minimized.

In addition, the measurement result at the modulation frequency f2=f1/N come under no influence of aliasing for at least signals reflected in the range corresponding to the N period of the pulse pattern at the modulation frequency f1. At this time, measuring the distance according to the phase difference θ2 in the distance measurement process at the modulation frequency f2 makes it possible to determine to which of the N pulses in the pulse pattern of the sub sequence SUS the reflection from the distance corresponds. Accordingly, the distance measurement result using the sequence SQ at the modulation frequency f2 satisfying the condition of the modulation frequency f2=f1/N can be cleared of the influence of aliasing in the distance range corresponding to the N period of the pulse pattern at the modulation frequency f1. Therefore, using the two distance measurement results makes it possible to obtain the distance measurement result without the influence of aliasing.

FIG. 5 is a timing chart with a delay of about one period. Even in the event of the influence of aliasing, the influence can be minimized up to the distance range corresponding to four periods (N periods) at the modulation frequency f1. This makes it possible to eliminate the influence of aliasing to a minimum on the distance measurement result.

In the present embodiment, the measurement distance result using the modulation frequency f2 is lower in resistance to interference from another sensor and aliasing than that in an embodiment described later because of not using a sequence with polarity change in the forward or reverse direction along the random numerical series. However, the objective of distance measurement at the modulation frequency f2 is to determine in which of the N periods the measurement result at the modulation frequency f1 has been obtained, which have no direct effect on the final accuracy. In addition, the accuracy required in this case is lower than the accuracy generally required for precise distance measurement (that is, the accuracy required for distance measurement at the modulation frequency f1). Therefore, even in the event of interference, unless the degree of the interference is critical, the measurement result using the modulation frequency f2 is usable without any practical problem and is applicable to a wider measurement range.

In the present embodiment, combining the distance measurement result at the modulation frequency f2 with no random polarity reversion with the distance measurement result at the modulation frequency f1 with random polarity reversion makes it possible to further increase the accuracy of distance measurement in a wider measurement range.

The pixel 16 illustrated in FIG. 2 is simply configured without a discharge switch 14c in an embodiment described later. The present embodiment can be carried out even with the switch 14c in the embodiment described later. Accordingly, the present embodiment is applicable to sensors with various types of pixels.

Second Embodiment

Figure 6:
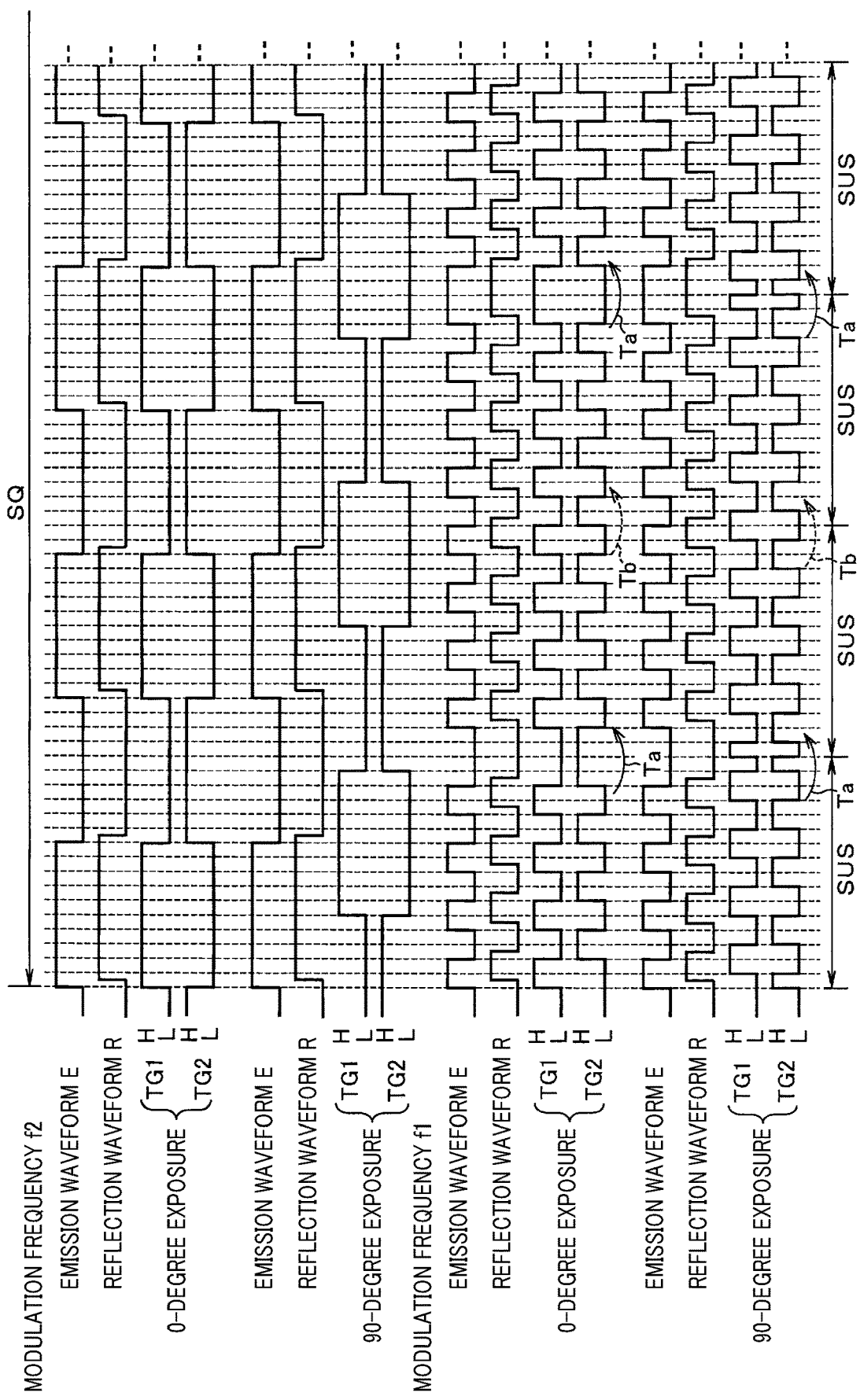
FIG. 6 is a diagram illustrating a sequence in a second embodiment.

FIG. 6 is a supplemental illustrative diagram of a second embodiment. In the first embodiment, the length of one period of the sequence SQ conforms to the length of the sub sequence SUS. In the second embodiment, the length of the sub sequence SUS is changed from the length of one period of the sequence SQ.

The period of the pulse pattern and the length of the sub sequence SUS can be set to satisfy the relationship the length of the sub sequence SUS (=(the period of the modulation frequency f1)×(the number N of pulse patterns))<the length of one period of the sequence SQ (=the period of the modulation frequency f2). FIG. 6 illustrates a timing Ta for forward polarity change by solid lines and a timing Tb for reverse polarity change by broken lines. As illustrated in FIG. 6, the relationship between the length of the sub sequence SUS and the modulation frequencies f1 and f2 can be set in any manner as far as the foregoing condition is satisfied.

In the second embodiment, making such settings creates the need to increase the measurement accuracy at the modulation frequency f2 as compared to the first embodiment but a wider range can be detected by the measurement at the modulation frequency f2. Accordingly, even if the measurement at the modulation frequency f1 has an offset, the offset can be absorbed by only the subsequent process.

Third Embodiment

Figure 7:
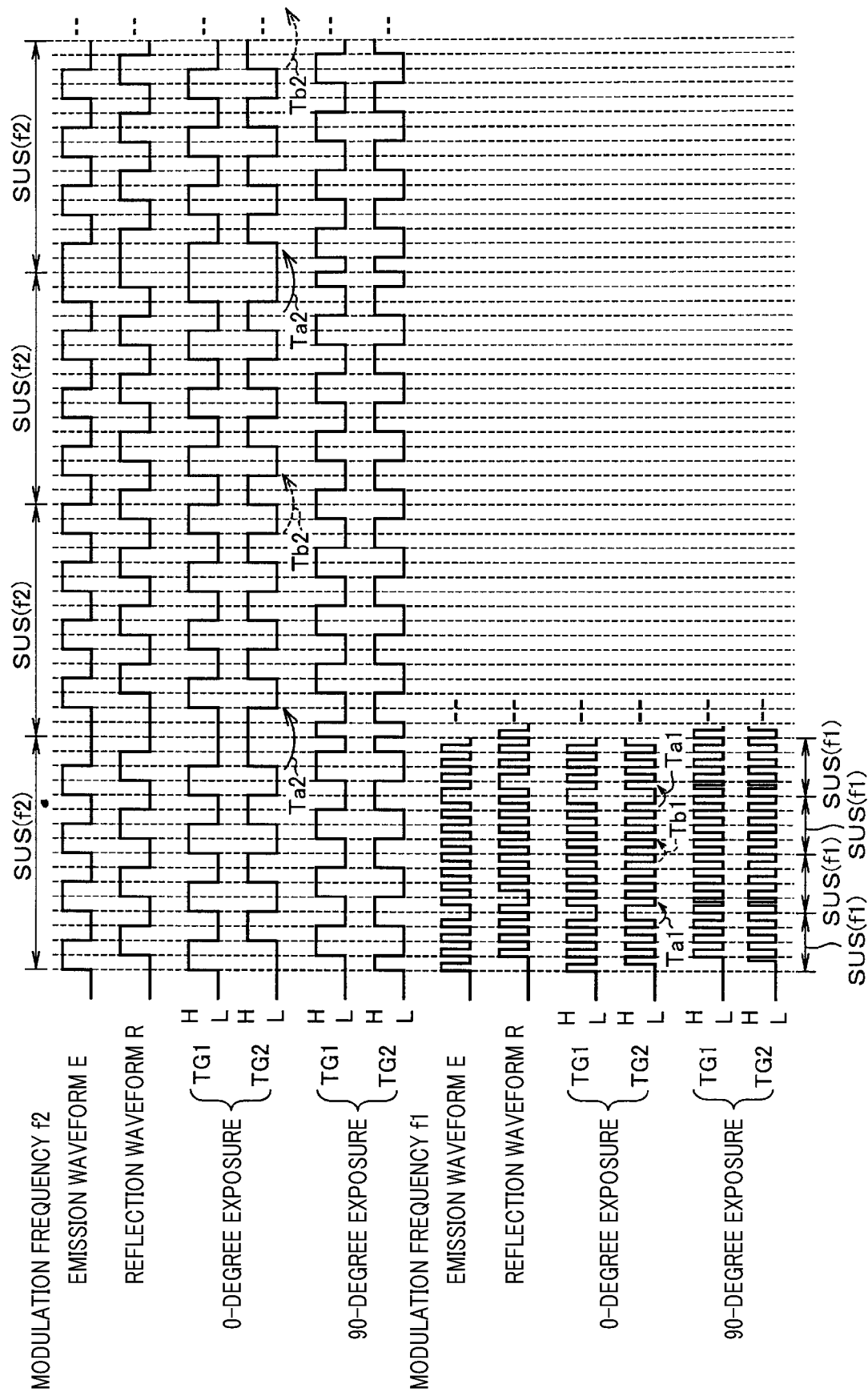
FIG. 7 is a diagram illustrating a sequence in a third embodiment.

FIG. 7 is a supplemental illustrative diagram of a third embodiment. In the first embodiment, the basic sequence SQ is applied to the distance measurement process using the modulation frequency f2 on the condition that the errors caused by the interference from other sensors are permissible in the distance measurement process using the modulation frequency f2. Alternatively, as in the distance measurement process at the modulation frequency f1 in the first embodiment, the sub sequence SUS (f2) with a plurality of number of repetitions of a pulse pattern may be used such that the polarity is changed in the forward or reverse direction at random with a ½ probability at each execution of the sub sequence SUS (f2). In the example of FIG. 7, timings Ta1 and Ta2 for forward polarity change are indicated by solid lines and timings Tb1 and Tb2 for reverse polarity change are indicated by broken lines.

The light emission control circuit 3 uses the sub sequence SUS (f2) with M repetitions of a pulse pattern such that the phase polarity is changed in the forward or reverse direction at random with a ½ capabilities at each execution of the sub sequence SUS (f2), and repeats the sub sequence SUS (f2) about several thousands to several hundreds of thousands of times. The sub sequence SUS (f2) corresponds to the second sub sequence. As with the "N times", the "M times" is desirably set to a natural number of 2 or larger that is significantly smaller than the number of repetitions of the sub sequence SUS, such as powers of 2 or two to ten times (for example, 3, 4, 8, and 16 times). Among them, in particular, setting to a power of 2=4, 8, 16, and 32 would make it easy to configure a logic by hardware or software, for example. In addition, the modulation frequency f2 used at this time is also lower than the modulation frequency f1.

In this case, the exposure time at the modulation frequency f2 is desirably longer than that in the first embodiment. No reflected light from the distance corresponding to the period M×2π or more of the sub sequence SUS (f2) at the modulation frequency f2 is observed at any of the modulation frequencies f1 and f2. This point can be alleviated by lengthening the period of the sub sequence SUS (f2).

Fourth Embodiment

Figure 8:
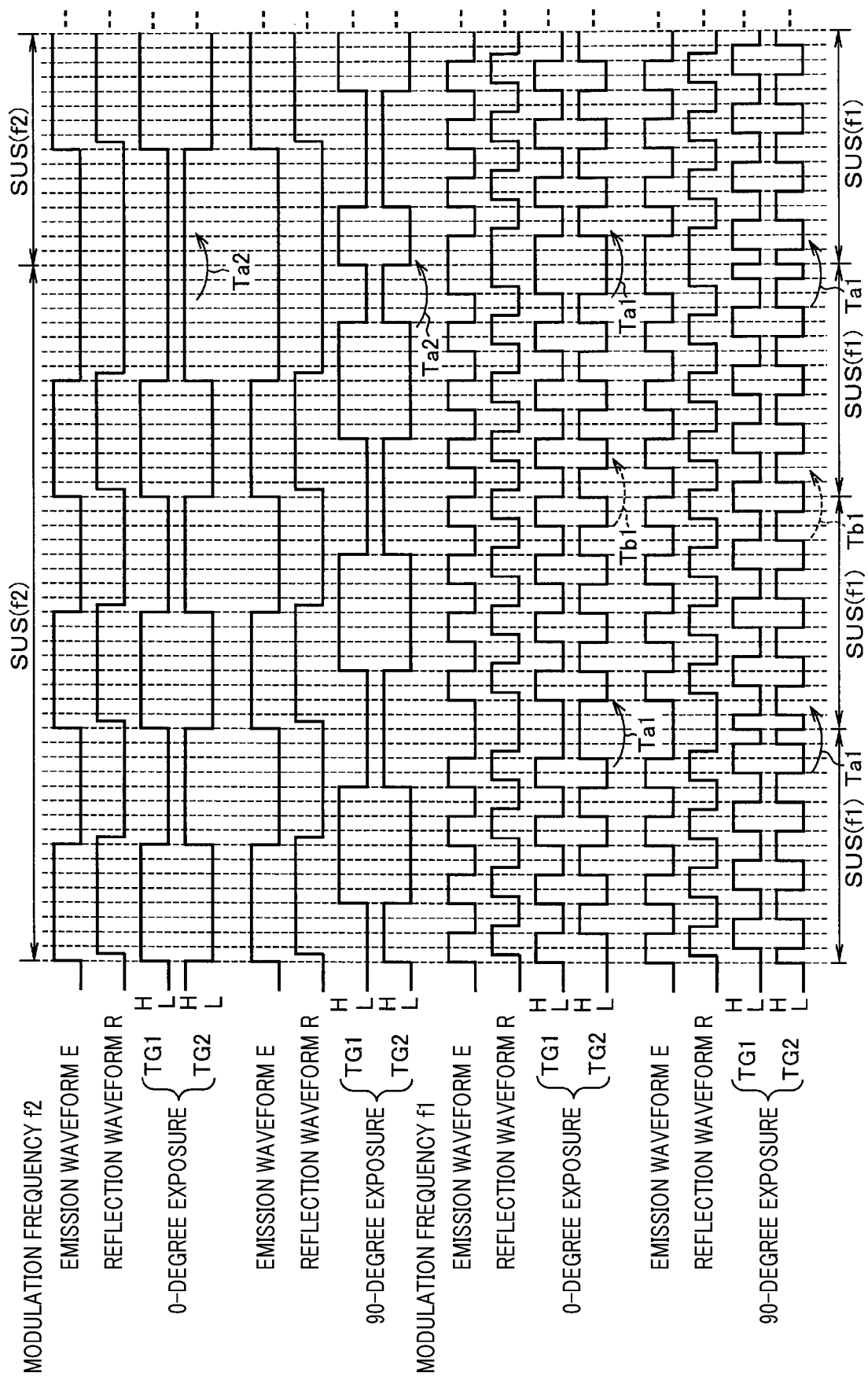
FIG. 8 is a diagram illustrating a sequence in a fourth embodiment.

FIG. 8 is a supplemental illustrative diagram of a fourth embodiment. The fourth embodiment constitutes another application example of the third embodiment. FIG. 8 illustrates timings Ta1 and Ta2 for forward polarity change by solid lines and a timing Tb1 for reverse polarity change by broken lines. In the fourth embodiment, the period of the sub sequence SUS (f2) at the modulation frequency f2 corresponds to three periods of the sub sequence SUS (f1) at the modulation frequency f1. This produces the same advantageous effects.

Fifth Embodiment

Figure 9:
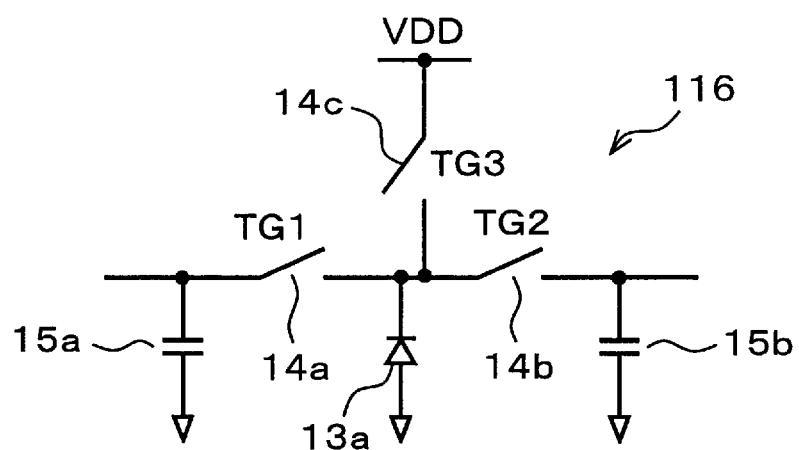
FIG. 9 is a diagram illustrating a partial configuration of a light receiving element in a fifth embodiment.
Figure 10:
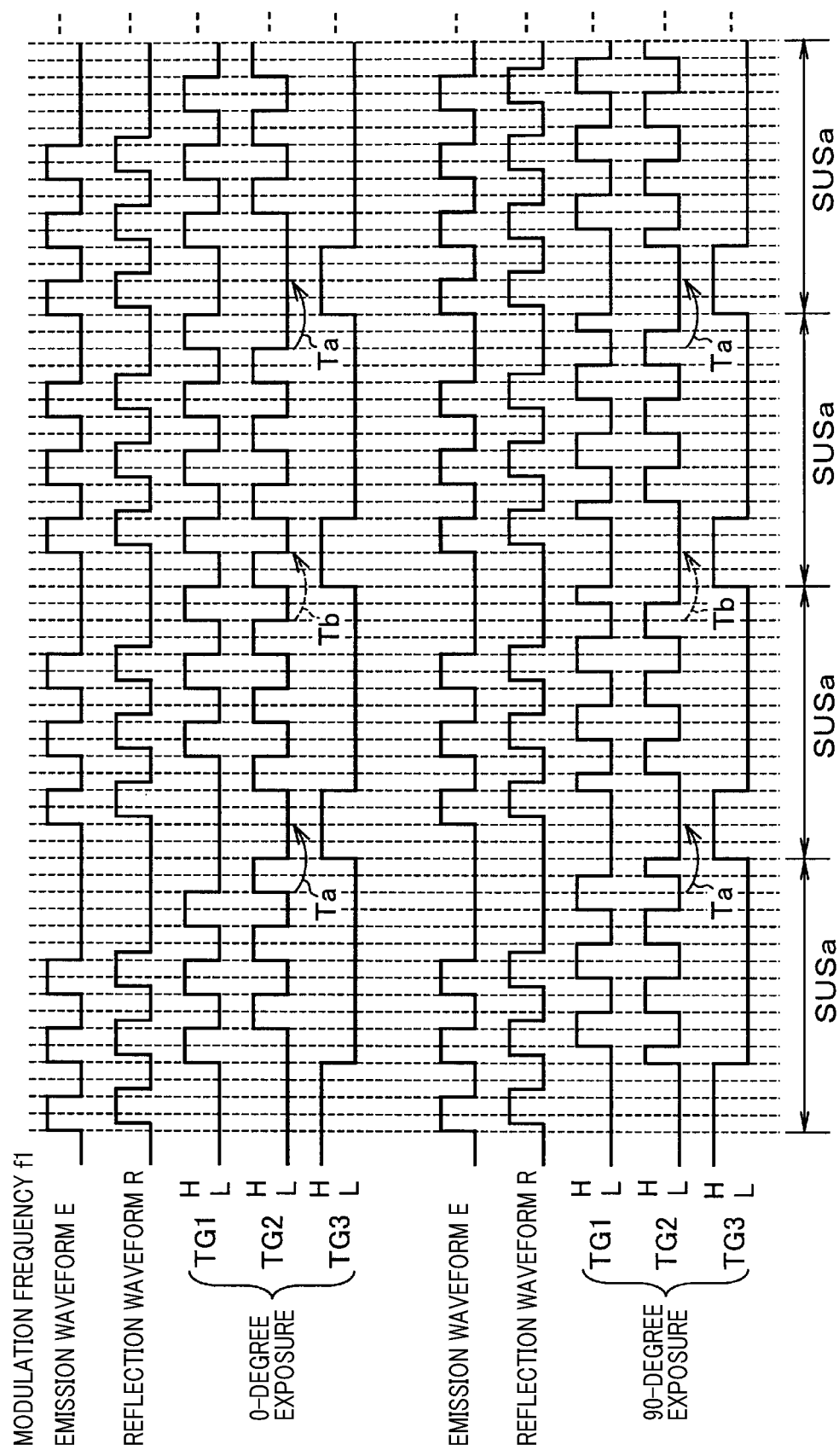
FIG. 10 is a diagram illustrating a sequence.
Figure 11:
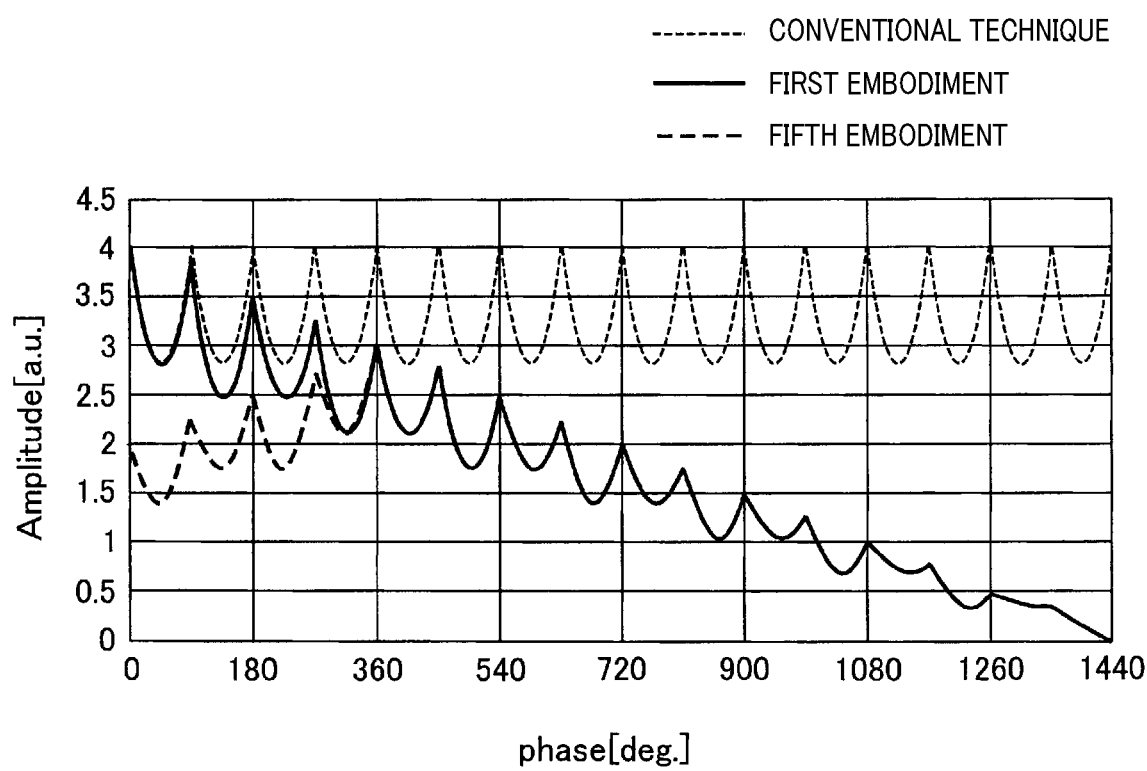
FIG. 11 is a diagram illustrating gain characteristics with respect to phase changes.

FIGS. 9 to 11 are additional illustrative diagrams of a fifth embodiment. When it is considered that the characteristics of the S/N ratio need to be further improved under the environment where background light dominates noise on the whole, the characteristics of the S/N ratio can be improved by purposefully shortening the time of signal integration in a pixel.

In this case, it is desired to change the configuration of a pixel 116 as illustrated in FIG. 9 and execute a sequence control illustrated in FIG. 10 at the modulation frequency f1. As illustrated in FIG. 9, the pixel 116 includes modulation switches 14a and 14b and a discharge switch 14c different from the modulation switches 14a and 14b.

As illustrated in FIG. 10, there are set periods in which the modulation switches 14a and 14b are turned off at the same time and the other discharge switch 14c is turned on, that is, periods in which both the control signals TG1 and TG2 become "L" and the control signal TG3 becomes "H". The electric charges generated in the PD 13 during these periods are not stored in the storage capacitances 15a and 15b but are collected in a power source (for example, VDD).

As illustrated in FIG. 10, the reception of light at a timing delayed by one period of a pulse pattern in a sub sequence SUSa will be described as an example. As illustrated in FIG. 10, in one period of the sub sequence SUSa, there is no emission of light in the last one of the N pulse patterns from the timing when the light emission control circuit 3 starts light emission control. The light emission control circuit 3 performs reversion or non-reversion of the phase of light emission at each execution of the sub sequence SUSa. The light emission control circuit 3 also stops light emission in a latter-side one (equivalent to N1) of the pulse patterns of the sub sequence SUSa.

The light reception control circuit 5 starts to turn the control signals TG1 and TG2 into "H" at the timing corresponding to the second pulse pattern of the sub sequence. That is, the light reception control circuit 5 disables the exposure period of the light receiving element 6, as a non-exposure period, in a former-side one (equivalent to N2) of the pulse patterns of the sub sequence SUSa.

As described above, the light emission control circuit 3 stops light emission in the later-side one (equivalent to N1) of the pulse patterns of the sub sequence SUSa. In concert with this, the light reception control circuit 5 controls the timing for setting the control signals TG1 and TG2 to "H" to complete within the same sub sequence SUSa, for example, thereby to disable the fourth (N-th) exposure period.

Referring to FIG. 10, there is set a period during which the control signal TG3 is "H" in each of the sub sequences SUSa. When the control signal TG3 is "H", the electric charges based on the reflection waveform R are not stored in the storage capacitances 15a and 15b but are discarded. The light reception control circuit 5 sets the timing for setting the control signal TG3 to "H" as the non-exposure period described above. Accordingly, while the control signal TG3 is "H", eliminating the influences of background light and light from another sensor makes it possible to adjust the sensitivity to signals received at delayed timings and improve the S/N ratio.

As illustrated in FIG. 11, when the technique in the first embodiment is applied, the gain decreases according to the distance and becomes maximum in closest vicinity of the sensor. This is because the reflected light with a phase delay of one or more periods is evenly distributed into the positive and negative capacitances and canceled as with the interferences from other sensors. In general, however, the intensity of reflected light is inversely proportional to the square of the distance to an object at the same reflection rate and thus it is expected that the intensity of the reflected light is originally high in the vicinity of the sensor. Therefore, having the peaks of the gain in proximity as in the first embodiment is not preferred from the viewpoint of ensuring the dynamic range. According to the present embodiment, for improvement of the gain characteristics, the peaks are adjusted in the first period, that is, at the amplitude level with a delay of phase $2\pi$ as seen in the characteristics of the fifth embodiment illustrated in FIG. 11. Accordingly, the gain corresponding to the short distance and the gain corresponding to the long distance can have as flat characteristics as possible, and making appropriate gain adjustments improves the S/N ratio in a wider range. As illustrated in FIG. 11, the gain in the waveform with a delay of one period is equivalent to that in the first embodiment. However, the time during which background light is not integrated is set in the present embodiment as illustrated in FIG. 10 and thus the S/N ratio in the present embodiment can be more improved than that in the first embodiment.

In the present embodiment, the light emission control circuit 3 stops light emission from the light receiving element in the latter-side one (equivalent to N1) of the N pulse patterns of the sub sequence SUSa, and the light reception control circuit 5 includes the non-exposure period of the light receiving element 6 in the former-side one (equivalent to N2) of the N pulse patterns of the sub sequence SUSa. The light reception control circuit 5 adjusts and increases the sensitivity to the signals received with a delay. This improves the S/N ratio.

The N1 is set to 1 in the foregoing embodiments but may be set to any of 1 to N−1. Similarly, the N2 is set to 1 in the foregoing embodiments but may be set to any of 1 to N−1.

Sixth Embodiment

Figure 12:
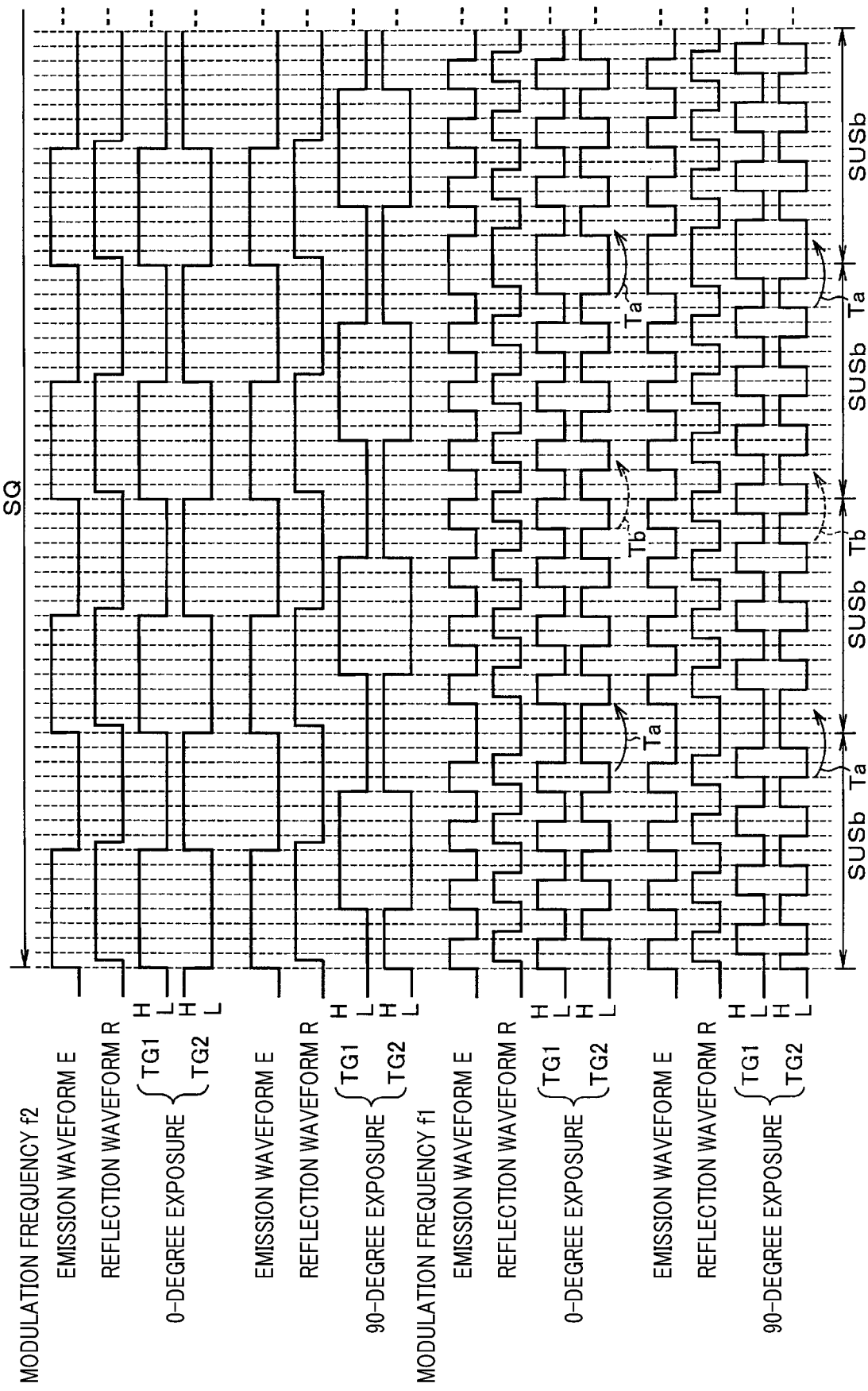
FIG. 12 is a diagram illustrating a sequence in a sixth embodiment.

FIG. 12 is a supplemental illustrative diagram of a sixth embodiment. In the first embodiment, when the modulation frequency f1 is the maximum frequency fmax, for example, the light reception control circuit 5 applies the control signals TG1 and TG2 of 90-degree exposure in a four-phase sequence SUSb to the modulation switches 14a and 14b as illustrated in FIGS. 4 and 8. However, as illustrated in FIG. 4 or 8, the control signals TG1 and TG2 of 90-degree exposure in the four-phase sequence SUSb have a pulse in the period ½ of 1/f1 corresponding to the first modulation frequency f1. Such a narrow pulse pattern generally makes stricter the requirement for the high-frequency response characteristics of a circuit, which may cause a difficulty in implementation.

In the present embodiment, to simplify the implementation, the light reception control circuit 5 generates a pulse pattern of the first control signals TG1 and TG2 of 0-degree exposure in the sub sequence SUSb repeated a plurality of number of times at the modulation frequency f1, and shifts the first control signals TG1 and TG2 by 90 degrees to generate a pulse pattern of the second control signals TG1 and TG2 of 90-degree exposure. This is more desirable.

This avoids the output of a narrow pulse pattern corresponding to a frequency higher than the first modulation frequency f1 and eliminates the need to generate a pulse at the frequency higher than the modulation frequency f1, thereby achieving easy implementation.

Seventh Embodiment

Figure 13:
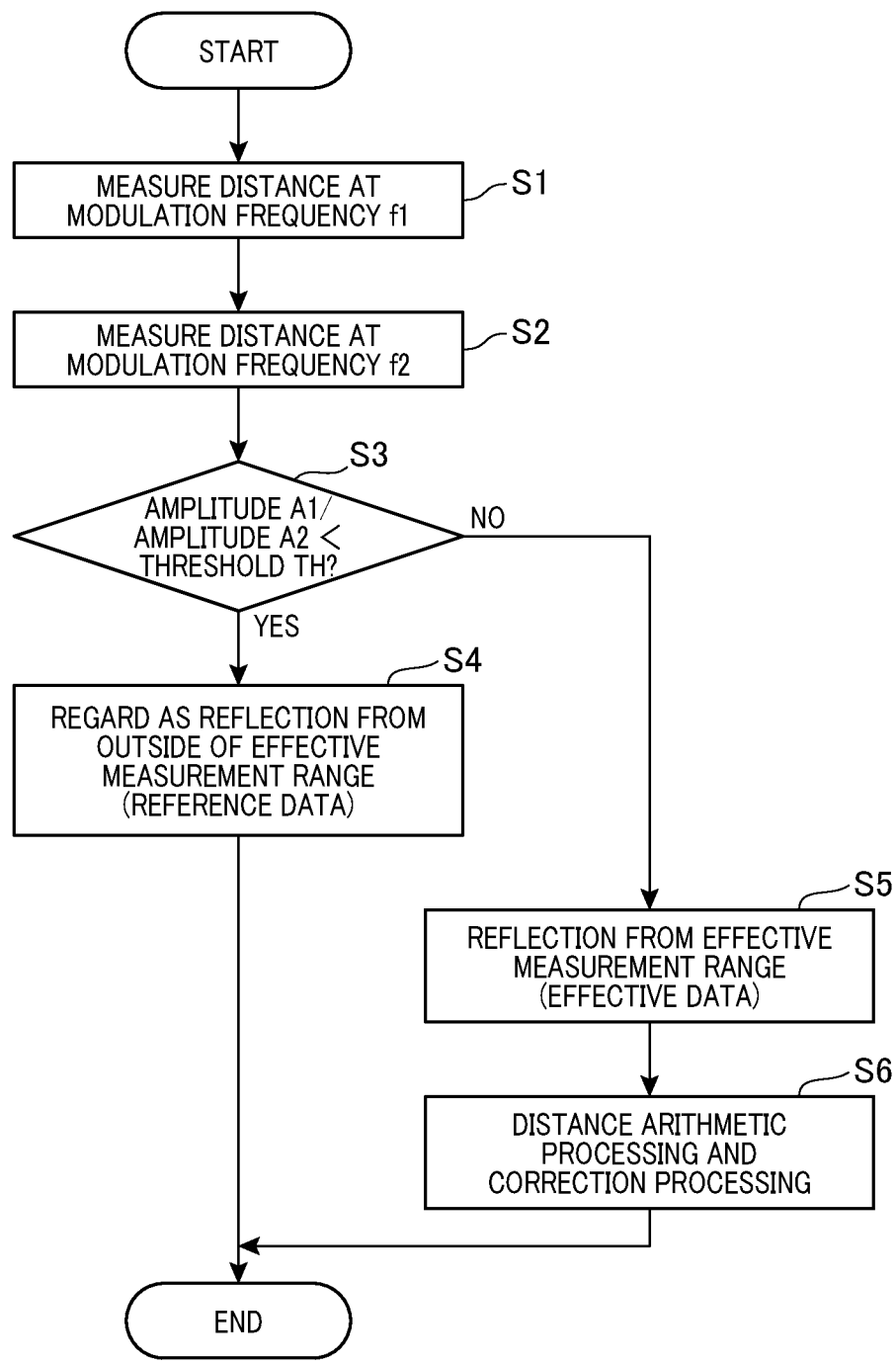
FIG. 13 is a schematic flowchart of a process in a seventh embodiment.

FIG. 13 is a supplemental illustrative diagram of a seventh embodiment. In the seventh embodiment, it is determined whether reference data reflected from the outside the distance range or effective data for distance arithmetic processing has been obtained according to the ratio of signal amplitude.

For example, in principal, the distance measurement result at the modulation frequency f1 in the first embodiment has no sensitivity to the phases of the length of the sub sequence SUS/the basic period of the sub sequence SUS×2π (corresponding to the distance). Accordingly, the pixel 16 captured using the modulation frequency f1 is not observed but the pixel 16 captured using the modulation frequency f2 is observed to be under the influence of reflected light outside the range of ½×the length of the sub sequence SUS/the basic period of the sub sequence SUS×c/fm (equivalent to the effective measurement range). Therefore, the distance value of the pixel 16 under the influence of the reflected light is used as reference data, and the pixel 16 not applied to the reference data is subjected to distance arithmetic processing.

As in an example described in FIG. 13, determination processing is provided such that the digital signal processing circuit 11 in the distance measurement device 1 performs the processing described in FIG. 13 to make a determination on reference data or effective data. As described in FIG. 13, in S1, the digital signal processing circuit 11 in the distance measurement device 1 calculates the phase difference φ based on the electric charges Q1 to Q4 obtained using the modulation frequency f1 to measure the distance.

After that, in S2, the digital signal processing circuit 11 in the distance measurement device 1 calculates the phase difference φ based on the electric charges Q1 to Q4 obtained using the modulation frequency f2 to measure the distance. Then, when the condition that the signal amplitude ratio A1/A2 is lower than the threshold TH is satisfied where A1 represents the amplitude of the reflection waveform R at the modulation frequency f1 and A2 represents the amplitude of the reflection waveform R at the modulation frequency f2, the digital signal processing circuit 11 in the distance measurement device 1 determines that the amplitude A1 of the reflection waveform R at the modulation frequency f1 is smaller and regards this reflection as being from the outside of the effective measurement range, and sets the data as reference data in S4.

In contrast, when not determining in S3 that the condition is satisfied, the digital signal processing circuit 11 regards this reflection as being from the effective measurement range and sets the data as effective data in S5. At this time, the digital signal processing circuit 11 determines the effectiveness of the result of the distance arithmetic processing, and performs correction processing (phase dissolution processing) of the distance arithmetic processing result at the modulation frequency f2 according to the measurement result at the modulation frequency f1. This eliminates the influence of aliasing.

Accordingly, it is possible to determine for each of the pixels 16 whether the data is reference data as reflection from the outside of the effective measurement range or effective data as reflection from the measurement range, thereby to omit the distance measurement accuracy improvement processing on the pixels 16 regarded as ineffective data. This makes it possible to perform distance measurement correctly as much as possible based on the effective data.

Other Embodiments

The present disclosure is not limited to the foregoing embodiments but can be modified or extended as described below.

The present disclosure is also applicable to purposes other than vehicles. The pulse patterns of the present disclosure include various pulse patterns such as a pulse pattern of sign waveform and a pulse pattern of rectangular waveform.

In the foregoing embodiments, the first modulation frequency f1 and the second modulation frequency f2 are used. However, the present disclosure is not limited to this but is also applicable to an aspect in which distance measurement is performed by combining a third modulation frequency lower than the first modulation frequency f1 with the second modulation frequency.

In the drawings, reference sign 1 represents the time-of-flight distance measurement device, 3 the light emission control circuit (the light emission control unit), 4 the light emitting element, 5 the light reception control circuit (the light reception control unit and the discharge control unit), 6 the light receiving element, 11 the digital signal processing circuit (the distance measurement unit and the signal processing unit), f1 the first modulation frequency, f2 the second modulation frequency, 14*a* and 14*b* the modulation switches, 14*c* the discharge switch, and 15*a* and 15*b* the storage capacitances.

The plurality of embodiments described above may be combined with one another. For example, the function of one constituent element may be distributed among a plurality of constituent elements or the functions of a plurality of constituent elements may be implemented by one constituent element. At least some of the components of the foregoing embodiments may be replaced with publicly known components with the same functions. Some or all of the components of two or more of the foregoing embodiments can be combined with or added to each other or replaced with each other. The reference signs parenthesized in the claims represent the correspondences with the specific units in the embodiments described above as one aspect of the present disclosure but are not intended to limit the technical scope of the present disclosure.

The present disclosure has been described so far according to the embodiments, but it is noted that the present disclosure is not limited to the foregoing embodiments or structures. The present disclosure includes various modifications and changes in a range of equivalency. In addition, various combinations and aspects, and other combinations and aspects including only one element of the foregoing combinations and aspects, less or more than the one element fall within the scope and conceptual range of the present disclosure.

The invention claimed is:

1. A time-of-flight distance measurement device comprising:
   a light emission control unit that causes a light emitting element to emit light modulated at a plurality of modulation frequencies, which include at least two or more different modulation frequencies including a first modulation frequency and a second modulation frequency and output the modulated light to a space;
   a light reception control unit that receives incident light including reflected light from a target at which the modulated light has been reflected and samples electric charges stored in a light receiving element that divides and stores the electric charges corresponding to the incident light into a plurality of storage capacitances; and
   a distance measurement unit that measures a distance from a subject device to the target according to the electric charges sampled by the light reception control unit using the light receiving element, wherein when a pattern of the modulated light in which a pulse pattern at the first modulation frequency highest among the plurality of modulation frequencies is repeated N times, where N is a natural number of 2 or larger, is a sub sequence, the light emission control unit controls the light emitting element to emit light such that a phase polarity is changed in a forward or reverse direction at random with a ½ probability at each transmission of the sub sequence, the distance measurement unit measures the distance according to the plurality of modulation frequencies including the first modulation frequency and the second modulation frequency lower than the first modulation frequency, the distance measurement unit is configured such that, when measuring the distance at the first modulation frequency, a storage capacitance of the light receiving element which stores or discharges electric charges according to the timing when the polarity of the phase is controlled by the light emission control unit at each transmission of the sub sequence and the distance is measured according to the electric charges stored in the storage capacitance, and the distance measurement unit includes a signal processing unit that corrects the distance measurement result based on the measurement result at the first modulation frequency and the measurement result at the second modulation frequency.

2. The time-of-flight distance measurement device according to claim 1, wherein, the second modulation frequency is set to allow measurement of a distance range of values equal to or greater than ½×c/f1×N corresponding to a distance range where the first modulation frequency is f1.

3. The time-of-flight distance measurement device according to claim 1, wherein, the second modulation frequency is set to a frequency of 1/N of the first modulation frequency.

4. The time-of-flight distance measurement device according to claim 1, wherein:

the light emission control unit sets a pattern of modulated light at the second modulation frequency in which a pulse pattern is repeated M times, where M is a natural number of 2 or larger, as a second sub sequence, and causes the light emitting element to emit light while changing the phase in the forward or reverse direction at random with a ½ probability at each transmission of the second sub sequence; and the distance measurement unit is configured such that, when measuring the distance according to the second modulation frequency, the storage capacitance of the light receiving element stores or discharges electric charges according to the timing when the polarity of the phase is controlled by the light emission control unit at each transmission of the second sub sequence and the distance is measured according to the electric charges stored in the storage capacitance.

5. The time-of-flight distance measurement device according to claim 4, wherein, the M is a power of 2 that is any of 2, 4, 8, 16, and 32 or is formed from a natural number of 2 to 10.

6. The time-of-flight distance measurement device according to claim 1, wherein:

the light emission control unit stops light emission from the light emitting element in a latter-side N1 of N pulse patterns of the sub sequence at the first modulation frequency, where N1 is any of 1 to N−1; and the light reception control unit sets a non-exposure period of the light receiving element in a former-side N2 of the N pulse patterns of the sub sequence, where N2 is any of 1 to N−1, to adjust and increase sensitivity to signals received with delay.

7. The time-of-flight distance measurement device according to claim 6, wherein:

the light receiving element includes a pixel that has a discharge switch provided to discharge the stored electric charges; and the time-of-flight distance measurement device further comprises a discharge control unit that, when the light receiving element is set in the non-exposure period by the light reception control unit, discharges electric charges generated by background light using the discharge switch.

8. The time-of-flight distance measurement device according to claim 1, comprising a comparison unit that compares an amplitude A1 of reflection waveform at the first modulation frequency with an amplitude A2 of reflection waveform at the second modulation frequency, wherein, when the comparison unit determines that a signal amplitude ratio A1/A2 is greater than a threshold, this reflection is regarded as being from the effective measurement range and the distance is measured.

9. The time-of-flight distance measurement device according to claim 1, wherein, when a four-phase sequence of 0-degree exposure and 90-degree exposure is applied, the light reception control unit generates a pulse pattern of a first control signal of the 0-degree exposure in the sub sequence repeated a plurality of number of times at the first modulation frequency and generates a pulse pattern of a second control signal of the 90-degree exposure by shifting the first control signal by 90 degrees.

10. The time-of-flight distance measurement device according to claim 1, wherein, the N is a power of 2 that is any of 2, 4, 8, 16, and 32 or is formed from a natural number of 2 to 10.

* * * * *